United States Patent [19]
Kuroda et al.

[11] Patent Number: 5,751,686
[45] Date of Patent: May 12, 1998

[54] SCANNING PROBE TIP COVERED WITH AN ELECTRICAL RESISTANCE TO LIMIT RECORDING/REPRODUCING CURRENT

[75] Inventors: Ryo Kuroda, Kawasaki; Shunichi Shido, Sagamihara, both of Japan

[73] Assignee: Canon Kabushiki Kaisha, Tokyo, Japan

[21] Appl. No.: 665,457

[22] Filed: Jun. 18, 1996

[30] Foreign Application Priority Data

Jun. 19, 1995 [JP] Japan .................. 7-175490

[51] Int. Cl.$^6$ .................................. G11B 9/00
[52] U.S. Cl. .................................. 369/126; 250/306
[58] Field of Search .................. 369/126, 101; 250/306, 310, 307

[56] References Cited

U.S. PATENT DOCUMENTS

| | | | |
|---|---|---|---|
| 4,343,993 | 8/1982 | Binnig et al. | 250/306 |
| 4,575,822 | 3/1986 | Quate | 369/126 |
| 4,724,318 | 2/1988 | Binnig | 250/306 |
| 5,289,455 | 2/1994 | Kuroda et al. | 369/126 |
| 5,321,685 | 6/1994 | Nose et al. | 369/126 |
| 5,396,066 | 3/1995 | Ikeda et al. | 369/126 |
| 5,461,605 | 10/1995 | Takimoto et al. | 369/126 |
| 5,481,528 | 1/1996 | Eguchi et al. | 369/126 |
| 5,546,374 | 8/1996 | Kuroda et al. | 369/126 |

FOREIGN PATENT DOCUMENTS

| | | |
|---|---|---|
| 63-161552 | 7/1988 | Japan . |
| 63-161553 | 7/1988 | Japan . |
| 1-245445 | 9/1989 | Japan . |
| 3-194124 | 8/1991 | Japan . |
| 8-106658 | 4/1996 | Japan . |

*Primary Examiner*—David C. Nelms
*Assistant Examiner*—Kim-Kwok Chu
*Attorney, Agent, or Firm*—Fitzpatrick, Cella, Harper & Scinto

[57] ABSTRACT

A probe for use in an information recording apparatus for recording information on a recording medium by applying a voltage between the recording medium and a tip of the probe includes a conductive tip, wiring provided on the probe for applying a voltage to the tip from a voltage application device, and an electrical resistance provided in the tip or in the wiring on the probe. The resistance may be composed of an oxide film on the surface of the tip. Instead of providing the electrical resistance, the tip or the wiring may be covered with an electromagnetic shield. As another alteractive, an electrical resistance layer may be provided between a substrate of the recording layer and the tip of the probe.

11 Claims, 21 Drawing Sheets

APPLICATION VOLTAGE FOR RECORDING

VOLTAGE APPLIED TO RECORDING MEDIUM

APPLICATION VOLTAGE
FOR RECORDING

VOLTAGE APPLIED TO
RECORDING MEDIUM

SQUARE TRUNCATED NOTCH

SiO2
Si SUBSTRATE

RESIST

WIRING PORTION
Pt

TIP PORTION

RESIST

TIP PORTION

CURRENT LIMITING RESISTANCE PORTION

RESIST

Si3N4

NOTCH FOR CUT
Cr THIN FILM    GLASS

FROM PULSE APPLYING MEANS

OXIDATION FILM
CURRENT LIMITING THIN FILM RESISTANCE

Si3N4
RESIST
Si SUBSTRATE

PATTERNING TO CANTILEVER SHAPE

CANTILEVER SUPPORTING Si3N4 MEMBER

Aℓ WIRING

Au
Au TIP
MASK FOR SPINDT METHOD

INTERNAL SHAPE FOR ELECTROMAGNETIC SHIELDING
RESIST
INSULATING MEMBER

ELECTROMAGNETIC SHIELDING Aℓ FILM

MICRO APERTURE
RESIST PORTION
RESIST PORTION

SCANNING PROBE TIP COVERED WITH AN ELECTRICAL RESISTANCE TO LIMIT RECORDING/REPRODUCING CURRENT

BACKGROUND OF THE INVENTION

1. Field of the Invention

The present invention relates to a probe and a recording medium for use in an information recording apparatus for effecting high-speed recording by applying a voltage between a recording medium and a probe opposed thereto, and to an information recording apparatus utilizing the same.

2. Related Background Art

The recent development of the scanning tunnel microscope (STM) capable of observing the surface of a conductive substance with a resolving power of nanometric order (U.S. Pat. No. 4,343,993) has enabled the observation of arrangement of atoms or orientation of organic molecules on the surface of a metal or a semiconductor, in the atomic or molecular scale. Also the technology of STM has been developed to the atomic force microscope (AFM), capable of observing the surface of an insulating substance with a resolving power similar to that of the STM (U.S. Pat. No. 4,724,318).

A high-density memory utilizing the principle of STM has been proposed by employing a recording medium instead of the specimen, bringing a probe close to the recording medium under feedback control on the distance between the probe and the recording medium so as to maintain the tunnelling current constant in the configuration of the STM and applying a voltage between the probe and the recording medium thereby recording and reproducing bits with a molecular or atomic size (U.S. Pat. No. 4,575,822, Japanese Patent Applications Laid-Open Nos. 63-161552 and 63-161553).

Also there has been proposed a configuration combining STM and AFM, which employs an elastic probe with electroconductivity and effects scanning by the tip of the probe in contact with the recording medium, thereby effecting recording and reproduction (Japanese Patent Applications Laid-Open Nos. 01-245445 and 03-194124).

In such a conventional contact scanning system, as the scanning is made by the movement of the probe along the surface of the recording medium basically relying on the elastic deformation of the elastic probe, there may result destruction of the probe tip or the recording medium, for example, by the heat induced by an excessive current during recording or reproduction, if a local defect or an unevenness in the thickness in the recording medium.

For this reason, Japanese Patent Application No. 6-239810 proposes to insert a current limiting resistor into the recording/reproducing circuit to limit the current to a constant value.

However such simple insertion of the current limiting resistor into the recording/reproducing circuit leads to a drawback of a reduced recording speed, as will be explained below with reference to FIGS. 1 to 3.

FIG. 1 schematically shows a recording/reproducing apparatus of the contact scanning method, wherein shown are a recording medium 1301; a probe 1302 of an elastic material, for effecting recording and reproduction in contact with the recording medium; a conductive tip 1303 provided at the end of the probe; and wiring 1304 for applying or obtaining a recording or reproduced signal.

A recording signal is applied from recording signal application means 1305 to the recording medium 1301, through a current limiting resistor RG 1306, the wiring 1304 on the probe 1302 and the tip 1303.

As the probe is positioned close to the recording medium in the actual configuration, there is generated a certain electrostatic capacitance Cs, called the floating capacitance, between the wiring and the tip on the probe and the recording medium. On the other hand, between the probe tip and the recording medium, there exists a gap resistance RG, resulting for example from the contact resistance, the tunneling resistance of a small space of a nanometric order existing between the probe tip and the recording medium and the film resistance of the recording medium itself.

FIG. 3 is an equivalent circuit diagram showing these component factors. For an angular velocity $\omega$ of the recording pulse signal ($\omega=2\pi f$, f being the frequency of the recording pulse signal), the impedance $1/\omega Cs$ induced by the floating capacitance Cs 1503 becomes smaller than the current limiting resistance RL.

For the typical values in the actual apparatus, the floating capacitance Cs is about 1 pF and the frequency f of the recording pulse signal is about 100 kHz, so that $\omega$ is about $6 \times 10^5$ rad/s and $1/\omega Cs$ is about 1.7 M$\Omega$. Also the typical value of the gap resistance RG is 1 to 1000 G$\Omega$ and that of the current limiting resistance RL is about 10 M$\Omega$.

Since $1/\omega Cs \ll RG$, the applied pulse voltage VP will be divided approximately with a ratio RL : $1/\omega Cs$ between RL and $1/(\omega Cs \cdot RG)$. Thus, when a recording signal voltage VP is applied, the voltage VG actually applied to the recording medium is:

$$VG = (1/\omega Cs) \cdot VP/(1/\omega Cs + RL) \cong 0.14 VP,$$

which is apparently smaller than VP.

This phenomenon becomes more conspicuous with an increase of $\omega$, namely with the recording signal of a higher frequency.

FIG. 2 shows the comparison of the applied recording voltage VP and the actually applied voltage VG.

As shown in FIG. 2, the voltage VG applied to the recording medium is smaller in the peak value and less sharp in time than the applied recording voltage VP.

In such situation, even if the recording signal VP is applied, recording cannot be effected since the voltage applied to the recording medium does not exceed the recording threshold.

Moreover the recording speed is lowered since the recording signal pulses cannot be applied continuously because of the unsharpened waveform.

SUMMARY OF THE INVENTION

In consideration of the foregoing, the object of the present invention is to provide a probe and a recording medium enabling highly reliable high-speed recording in an information recording apparatus, and an information recording apparatus utilizing such probe and recording medium.

The above-mentioned object can be attained, according to the present invention, by a probe for use in an information recording apparatus for recording information on a recording medium by applying a voltage between said recording medium and a tip, comprising:

a probe including a tip;

wiring provided on the probe for applying a voltage to the tip; and an electrical resistor provided in the tip or in the wiring on the probe.

The above-mentioned object can also be attained by a probe for use in an information recording apparatus for recording information on a recording medium by applying a voltage between the recording medium and a tip, the probe comprising:

a tip;

wiring provided on the probe for applying a voltage to said tip; and an electromagnetic shield covering the tip or the wiring on the probe.

The above-mentioned object can also be attained by a recording medium for use in an information recording apparatus for recording information on the recording medium by applying a voltage between the recording medium and a tip, the recording medium being composed of a conductive substrate and a recording layer formed on the substrate, and comprising an electrical resistance layer provided between the substrate and the tip.

The above-mentioned object can also be attained by an information recording apparatus for recording information on a recording medium by applying a voltage between recording medium and a tip, the apparatus comprising:

a probe having a conductive tip;

a voltage applying circuit for applying a voltage to the tip;

wiring provided on the probe for connecting the voltage applying circuit with the tip; and an electrical resistance provided in the tip or in the wiring on the probe.

The above-mentioned object can also be attained by an information recording apparatus for recording information on a recording medium by applying a voltage between the recording medium and a tip, the apparatus comprising:

a voltage applying circuit for applying a voltage between the tip and the recording medium;

a conductive substrate provided in the recording medium;

a recording layer provided in the recording medium and supported by the substrate; and an electrical resistance layer provided between the substrate and the tip.

The above-mentioned object can also be attained by an information recording apparatus for recording information on a recording medium by applying a voltage between the recording medium and a tip, the apparatus comprising:

a probe having a conductive tip;

a voltage applying circuit for applying a voltage to the tip;

wiring provided at least partly on the probe, for connecting the voltage applying circuit with the tip; and an electromagnetic shield covering the tip or the wiring on the probe.

More details will be given in the following description of the embodiments.

The term "probe" used in the present invention is a member composed of a tip of a conductive material having a sharpened end and a support member for supporting such tip.

BRIEF DESCRIPTION OF THE DRAWINGS

FIGS. 19(a) through 9(i) are views showing the preparation process of the probe shown in FIG. 17;

DESCRIPTION OF THE PREFERRED EMBODIMENTS

First the principle of the present invention will be explained.

Figure 4:
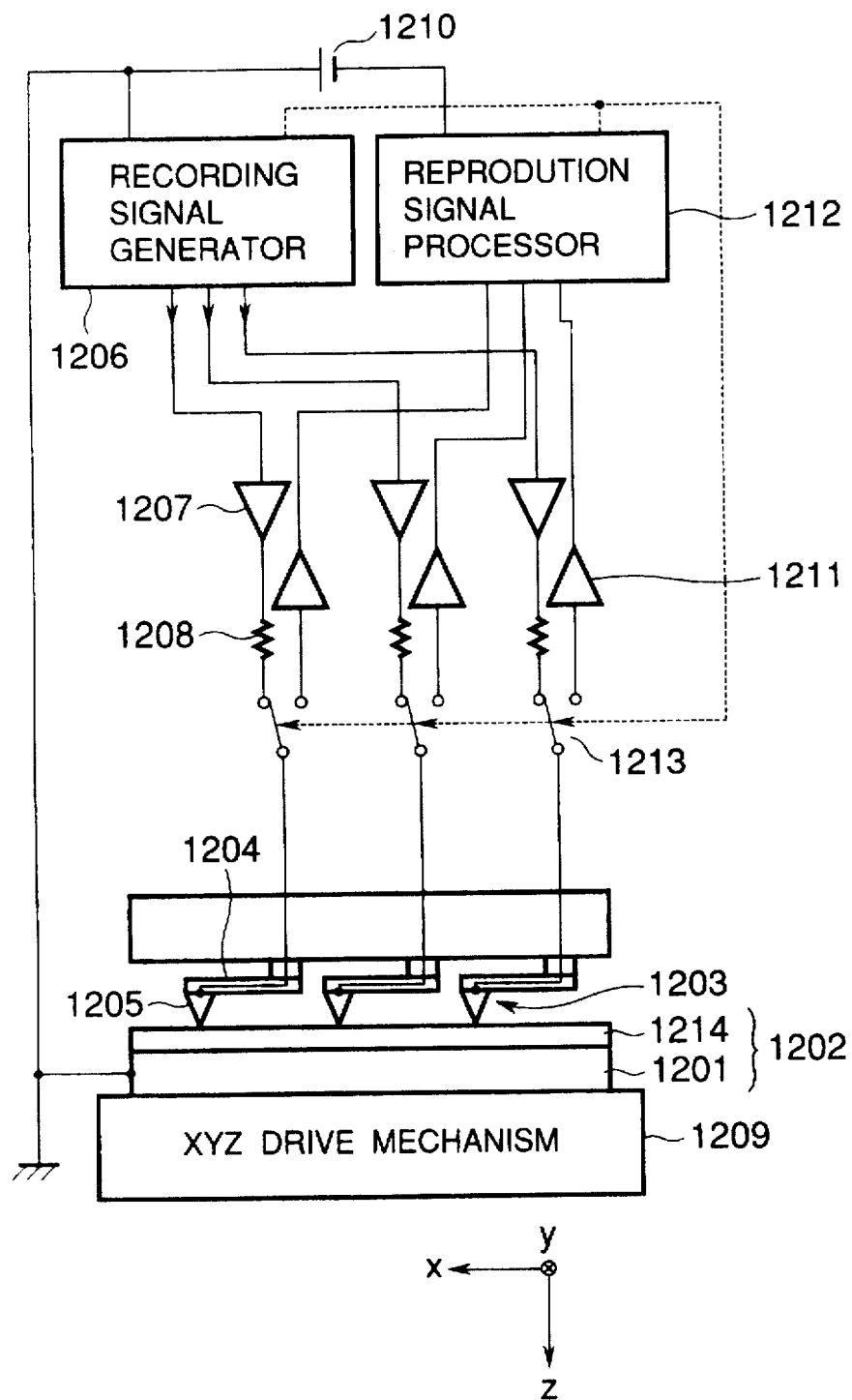
FIG. 4 is a view showing the structure and working principle of a recording/reproducing apparatus of the probe contact scanning method embodying the present invention.

Reference is first made to FIG. 4, showing the principle of the recording/reproducing apparatus of the probe contact scanning method, embodying the present invention.

Plural probes 1203 are so positioned that tips 1205 thereof are in contact with a recording medium 1202, having a recording layer 1214 on a conductive substrate 1201. In each probe 1203, the tip 1205 is supported by an elastic member 1204, capable of generating an elastic deformation.

Typically, the elastic member 1204 has an elastic constant of ca. 0.1 N/m for the elastic deformation and an amount of elastic deformation of ca. 1 μm, and, under such conditions, the tip contacts the recording medium with a contact force of ca. $10^{-7}$ N.

The probe 1203 and the recording medium 1202 are mutually movable, in three-dimensional manner, by an xyz drive mechanism 1209 attached to the recording medium 1202. The probe 1203 is brought to a desired position on the recording medium 1202, with a desired contact force thereto, by the adjustment of the position of the probe 1203 in the x, y directions and in the z direction with respect to the recording medium 1202.

A recording signal generated by a recording signal generator 1206 is applied to the recording medium 1202, through an amplifier 1207, a current limiting resistor 1208, wiring on the elastic member 1204 and the tip 1205. In this manner the recording is made locally at a position where the end of the tip 1205 contacts the recording layer 1214.

The recording layer 1214 in the above-explained apparatus is composed of a material showing a change in the current by a voltage application. A first example of such material is an LB film (superposed layers of an organic monomolecular film formed by the Langmuir-Blodgette method) having the electric memory effect, such as of polyimide or SQAZ (bis-n-octylsquarilium azulene) as disclosed in the Japanese Patent Application Laid-Open Nos. 63-161552 and 63-161553.

This material shows a change in the conductivity in the LB film from OFF to ON state, by the application of a voltage exceeding a threshold, such as 5 to 10 V, between the tip and the substrate across the LB film, thus showing an increase in the current under the application of a reproducing bias voltage of ca. 0.01 to 2 V.

A second example of the material of the recording layer is an amorphous film-forming material such as GeTe, GaSb or SnTe.

Such material shows a phase transition from an amorphous state to a crystalline state by the heat generated by the current therein, when a voltage is applied between the tip and the substrate across the amorphous film-forming material. The material thus shows a change in the conductivity, and shows an increase in the current when a reproducing bias voltage is applied.

A third example of the material of the recording layer consists of an oxidizable metal or semiconductor such as Zn, W, Si or GaAs.

When a voltage is applied between such oxidizable metal/semiconductor material and the tip, the material reacts with water absorbed on the surface thereof or oxygen in the air under the influence of the generated current, thereby forming an oxide film on the surface and showing a change in the contact resistance of the surface, so that it shows a decrease in the current when a bias voltage is applied.

The bit thus recorded can be reproduced in the following manner.

The signal wiring of each probe 1203 is switched to a reproducing system by a switch 1213, then a bias voltage is applied between the tip 1205 and the substrate 1201 by bias voltage applying means 1210, and a generated current is detected by a current detector 1211.

The recorded bit on the recording medium 1202 shows a larger (or smaller) current in comparison with the unrecorded portion, and such difference in the current is detected by a reproduced signal processor 1212 to obtain a reproduction signal.

In the recording/reproducing apparatus of the probe contact scanning method explained above, in the scanning motion of the probe relative to the recording medium, the end of the tip 1205 of the probe 1203 is constantly maintained in contact with the recording medium 1202.

Such contact scanning method provides an advantage that, during the scanning motion of the end of the tip 1205 in contact with the recording medium 1202, eventual irregularities on the surface of the recording medium 1202 can be absorbed by the elastic deformation of the elastic member 1204, whereby the contact force between the end of the tip 1205 and the surface of the recording medium can be maintained substantially constant and such end or surface can be prevented from destruction.

This method, not requiring the aligning means in the z-direction, such as a piezoelectric element, for each probe, is simpler in configuration and is particularly suitable for use in an apparatus with plural probes.

Also the probe 1203 can achieve a high-speed scanning motion relative to the recording medium 1202, since each probe 1203 need not be feedback controlled in the z-direction relative to the recording medium 1202.

In such contact scanning method, it is effective to utilize a current limiting resistance 1208 as shown in FIG. 4, in order to prevent, as already explained in the related background art, the destruction of the tip or the medium resulting from an eventual excessive current in the application of the recording pulse voltage in the course of contact scanning operation.

However, such current limiting resistance, if positioned distant from the probe, will lead to deterioration of the frequency characteristics of the recording pulse applying system with the resulting reduction of the peak value, and the lessening of sharpness in time ("unsharpening") of the voltage actually applied to the recording medium, as already explained in the related background art.

This drawback can be prevented by one of the following three methods:

1) positioning the current limiting resistance on the tip or in the vicinity thereof;
2) positioning the current limiting resistance in the recording medium, in the vicinity of a position opposed to the tip; and
3) reducing the floating capacitance of the pulse applying circuit.

Figure 5:
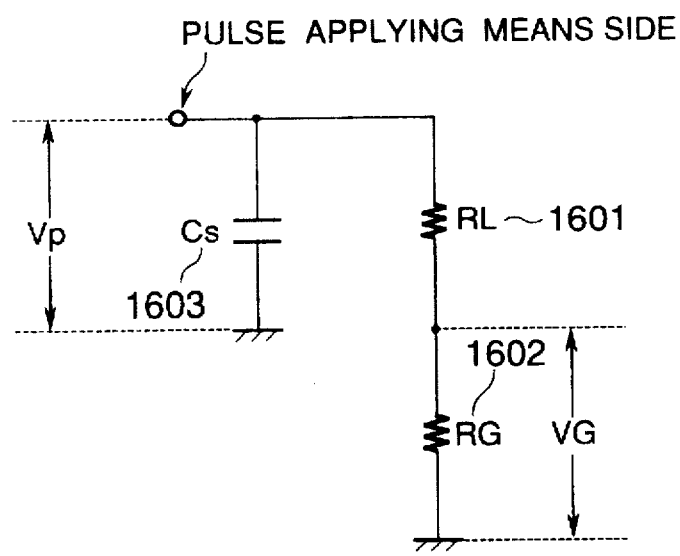
FIG. 5 is an equivalent circuit diagram in which the current limiting resistance and the gap resistance are in a serial relationship and the floating capacitance is connected in parallel to these components.

In case the current limiting resistance is positioned in the vicinity of the tip according to the above-mentioned method 1), when seen from the side of the pulse applying means in FIG. 5, the current limiting resistance RL1601 and the gap resistance RG1602 are connected in series, and the floating capacitance Cs 1603 is connected parallel to these components.

Figure 6A:
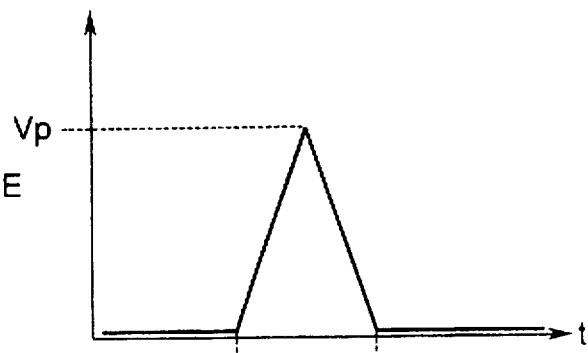
FIGS. 6 (a) and 6 (b) are charts showing comparison of the applied recording voltage and the voltage actually applied to the recording medium.
Figure 6B:
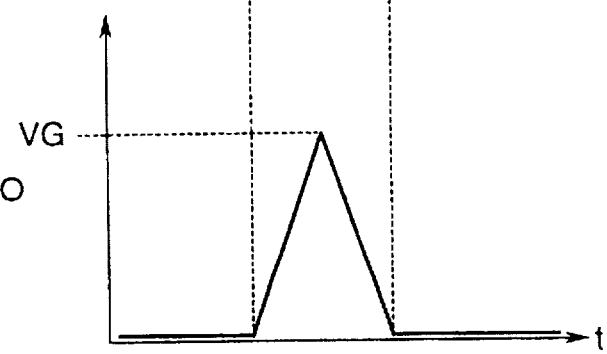

Consequently the applied pulse voltage VP is applied to RL+RG, and, since RL<<RG (typically RL≅10 MΩ and RG=1 to 1000 GΩ), the voltage VG applied to the recording medium becomes nearly equal to VP and is prevented from reduction and unsharpening, as shown in FIG. 6.

Figure 7:
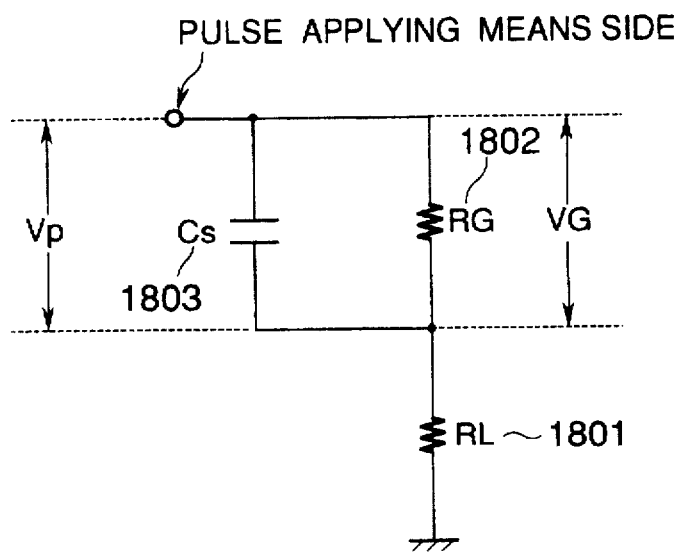
FIG. 7 is an equivalent circuit diagram in which the gap resistance and the current limiting resistance are in a serial relationship and the floating capacitance is connected in parallel to these components.

Also in case the current limiting resistance is positioned in the recording medium, in the vicinity of the contact position with the tip according to the method 2), when seen from the side of the pulse applying means in FIG. 7, the gap resistance RG1802 and the current limiting resistance RL1801 are connected in series, and the floating capacitance Cs1803 is connected parallel to these components. Consequently the applied pulse voltage VP is applied to RG+RL, and, since RL<<RG (typically RL≅10 MΩ and RG=1 to 1000 GΩ), the voltage VG applied to the recording medium becomes nearly equal to VP and is prevented from reduction and unsharpening of the peak.

By reducing the floating capacitance of the pulse applying circuit according to the method 3), the impedance $1/\omega Cs$ resulting from the floating capacitance Cs1503 (ω being the angular velocity of pulse, represented by ω=2πf, wherein f is the frequency of the recording pulse signal) can be made larger while being maintained sufficiently smaller than the gap resistance RG.

As a typical numerical example, by reducing the floating capacitance Cs to about 0.01 pF for ω≧2π×10$^5$ rad/s, 1/ωCs becomes about 160 MΩ, which is sufficiently smaller than RG=1 to 1000 GΩ but is larger than RL≦10 MΩ.

In this state, the applied pulse voltage VP is divided between RL and 1/ωCs with a ratio approximately equal to RL:1/ωCs, but, since RL<1/ωCs, the applied voltage VG becomes nearly equal to VP and is prevented from reduction and unsharpening of the peak.

In the following there will be explained embodiments for respectively realizing the methods 1) to 3) explained above.

[Embodiment 1]

Figure 8:
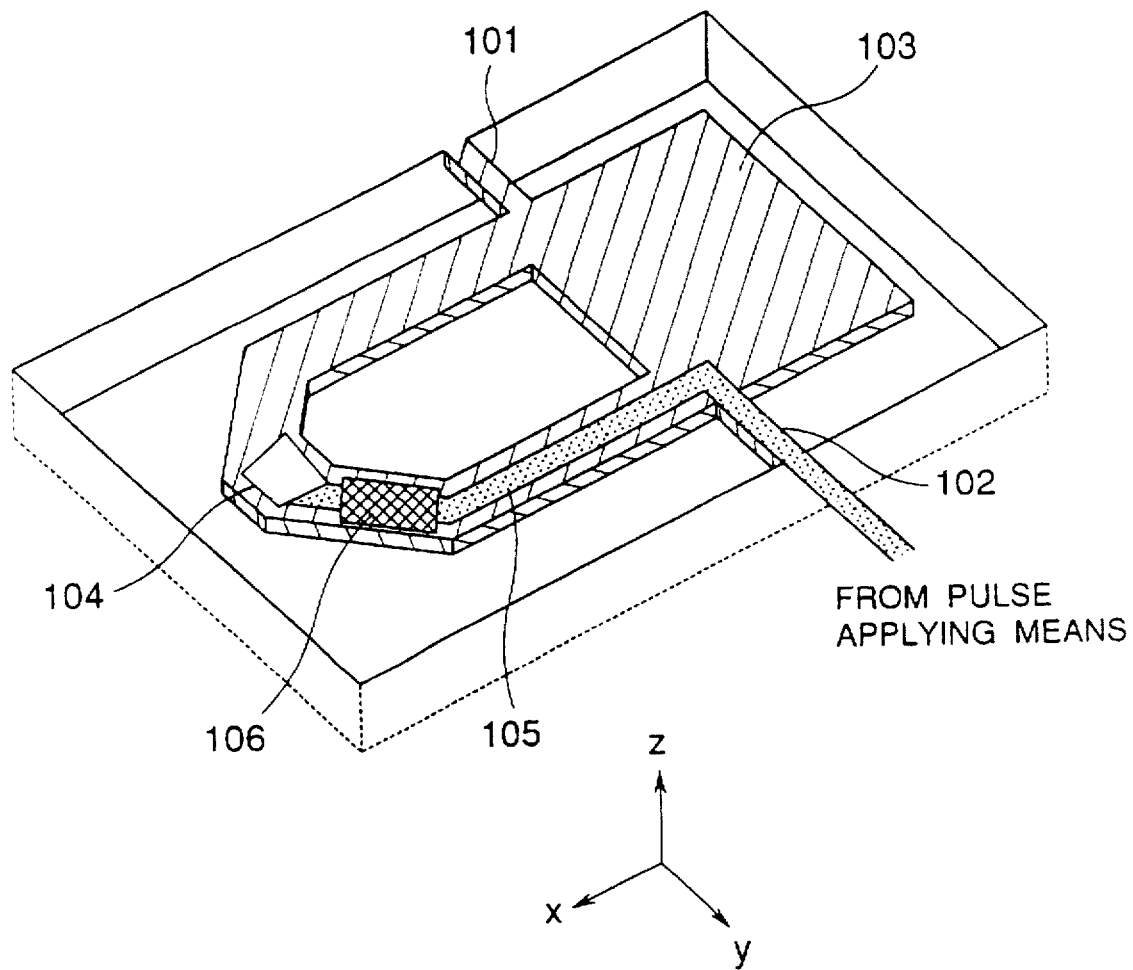
FIG. 8 is a view showing a probe constituting a first embodiment of the present invention.
Figure 9A:
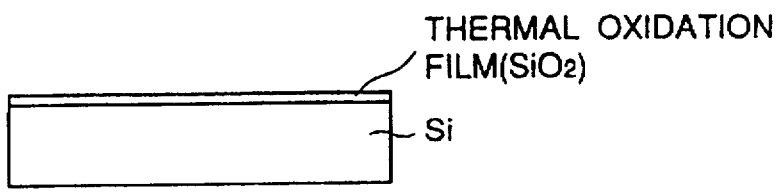
FIGS. 9(a) through 9(f) are views showing the preparation process of the probe shown in FIG. 8.
Figure 9B:
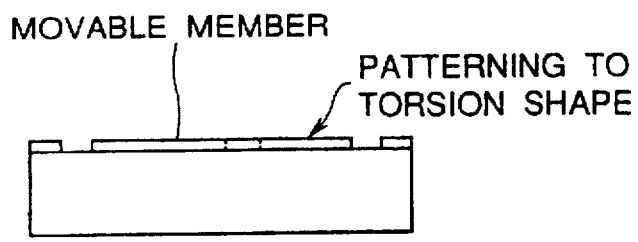
Figure 9C:
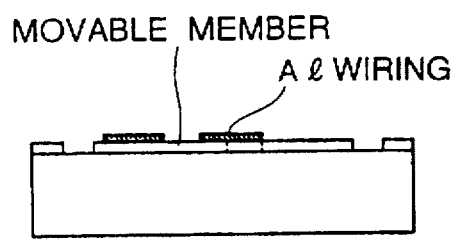
Figure 9D:
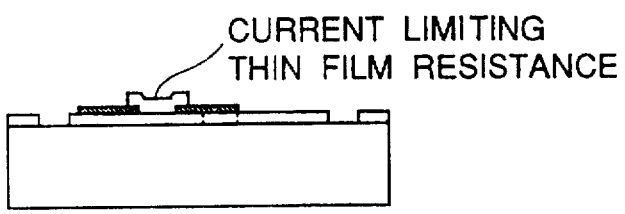
Figure 9E:
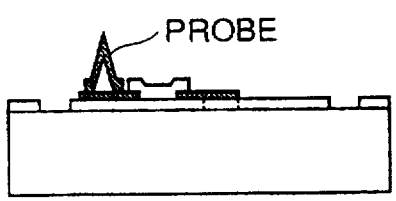
Figure 9F:
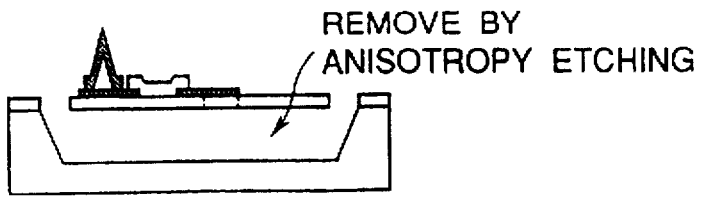

FIG. 8 shows a first embodiment of the probe of the present invention, in which the current limiting resistance is provided in wiring in the vicinity of the tip on a movable member supported by an elastic member of torsion bar type.

Referring to FIG. 8, a tip 104, wiring 105 and a current limiting thin-film resistor 106 are provided on a movable member 103 supported by elastic torsion bars 101, 102. The torsion in the elastic torsion bars 101, 102 generates an inclination in the movable member 103, thus moving the tip 104 in the z-direction.

As the current limiting thin-film resistor 106 is positioned in the vicinity of the tip 104, the floating capacitance between the tip 104 and the wiring 105 of a portion from the tip 104 to the resistor 106, and the recording medium (not shown) opposed to the tip 104 becomes minimal, so that the equivalent circuit becomes similar to that shown in FIG. 5.

FIG. 9 shows the preparation process of the probe of this embodiment. On the surface of a Si substrate having a surface orientation <100>, a thermal oxide film (SiO$_2$) is formed with a thickness of 1μm ((a) in FIG. 9). Then the SiO$_2$ film is patterned in the form of the torsion bars, thereby obtaining the form of the movable member ((b) in FIG. 9). After the formation of an Al wiring on the movable member ((c) in FIG. 9), a thin carbon film is formed by sputtering and patterned to form the current limiting thin-film resistor ((d) in FIG. 9).

Then the tip is formed for example by a method of adhering a tip formed on a replica mold or by a spindt method in which a needle-shaped structure is formed by evaporation under rotation through an apertured mask ((e) in FIG. 9), and the Si substrate is anisotropically etched with KOH solution to form gaps, thereby completing the movable member of the torsion bar type ((f) in FIG. 9).

When thus prepared probe was mounted on the recording/reproducing apparatus of the probe contact scanning method as shown in FIG. 4 (the current limiting resistance 1208 in FIG. 4 corresponding to the current limiting thin-film resistor (106 in FIG. 8) on the probe) and subjected to the application of a recording pulse voltage, the voltage VG applied to the recording medium was substantially equal, in height and wave form, to the applied recording pulse voltage VP as shown in FIG. 6, without reduction of the peak height or unsharpening of the waveform, and the frequency characteristics were improved.

This embodiment, though being inferior to the following second embodiment in the improvement of the frequency characteristics, is featured by a relatively simple preparation process, which leads to a lower cost and a smaller bending in the elastic member.

In the present embodiment, the elastic member is of a torsion bar type, but that of other types, for example, a cantilever type, can also be used.

[Embodiment 2]

Figure 10:
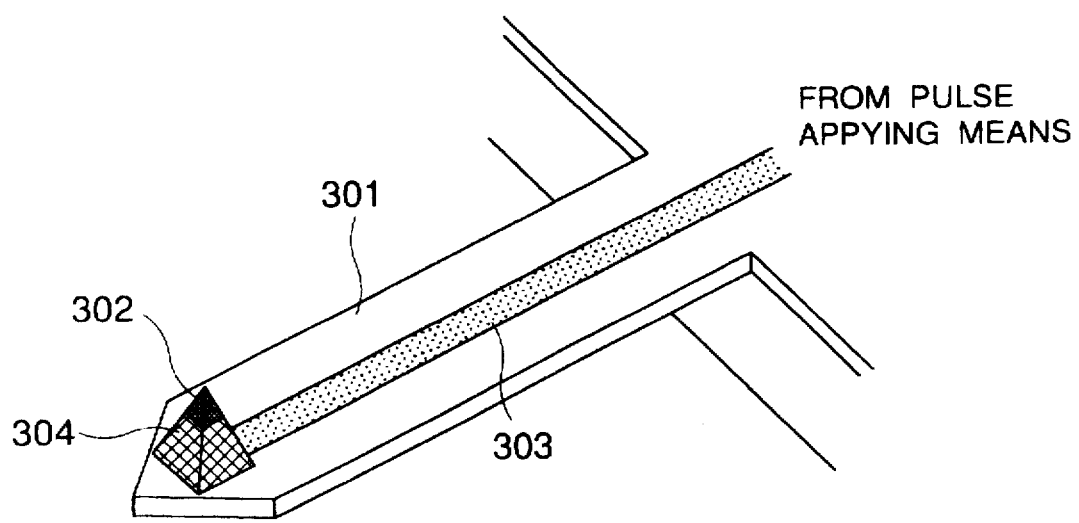
FIG. 10 is a view showing a probe constituting a second embodiment of the present invention.
Figure 11A:
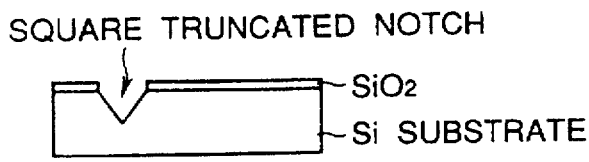
FIGS. 11(a) through 11(j) are views showing the preparation process of the probe shown in FIG. 10.
Figure 11B:
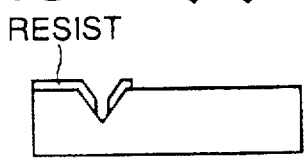
Figure 11C:
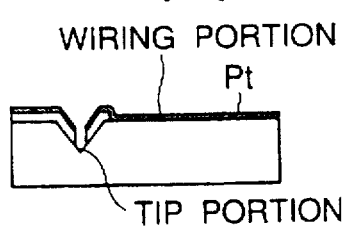
Figure 11D:
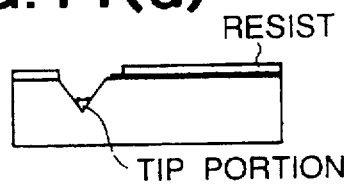
Figure 11E:
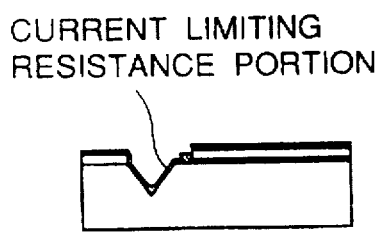
Figure 11F:
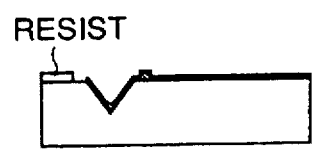
Figure 11G:
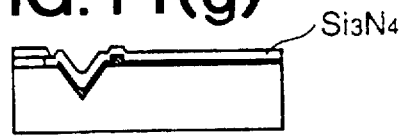
Figure 11H:
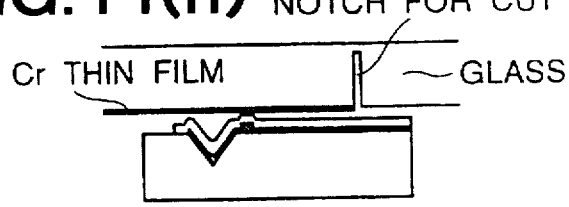
Figure 11I:
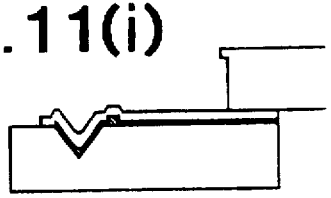
Figure 11J:
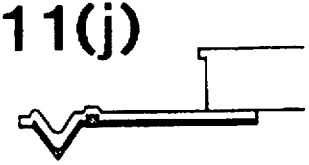

FIG. 10 shows a second embodiment of the present invention, providing a probe in which the current limiting resistance is provided integrally with the tip formed on an elastic member of a cantilever type.

Referring to FIG. 10, a tip 302, a wiring 303 and a current limiting resistor portion 304 are formed on a cantilever-shaped elastic member 301. A bending generated in the cantilever-shaped elastic member 301 moves the tip 302 in the z-direction in FIG. 10.

As the current limiting resistor portion 304 is formed integrally with the tip 302, the floating capacitance between the portion from the tip 302 to the current limiting resistor portion 304 and the recording medium (not shown) opposed to the tip 302 becomes minimal, so that the equivalent circuit becomes similar to that shown in FIG. 5.

FIG. 11 shows the preparation process of the probe of this embodiment. On the surface of a Si substrate having a surface orientation <100>, a thermal oxide film (SiO$_2$) is formed with a thickness of 0.1 μm. Then, for forming the tip, the SiO$_2$ is patterned as a rectangular mask, and aniosotropic etching is conducted with KOH solution to form a groove of rectangular conical form ((a) in FIG. 11). After SiO$_2$ is etched off, photoresist is formed and patterned for forming the tip and the wiring on the cantilever ((b) in FIG. 11), and Pt is deposited by evaporation to form the tip and the wiring ((c) in FIG. 11).

After Pt is patterned with photoresist, photoresist is coated again and is patterned into the form of a mask for forming the current limiting resistor portion ((d) in FIG. 11), and a thin carbon film is deposited by sputtering to form the current limiting resistor portion ((e) in FIG. 11).

Then, patterning is made into the form of a mask for forming the cantilever ((f) in FIG. 11), and a Si$_3$N$_4$ film of a thickness of 1 μm is formed by low pressure CVD to form the cantilever shape on the substrate ((g) in FIG. 11).

Then a groove for cutting is formed, and, after anodic bonding of a glass plate provided locally with a separating Cr film to the substrate ((h) in FIG. 11), the glass plate is cut ((i) in FIG. 11) and Si is etched off with KOH solution to form the cantilever ((j) in FIG. 11).

When thus prepared probe was mounted on the recording/reproducing apparatus of the probe contact scanning method as shown in FIG. 4 (the current limiting resistance 1208 in FIG. 4 corresponding to the current limiting thin-film resistor (304 in FIG. 10) on the probe) and subjected to the application of a recording pulse voltage, the voltage VG applied to the recording medium was substantially equal, in height and wave form, to the applied recording pulse voltage VP as shown in FIG. 6, without reduction of the peak height or unsharpening of the wave form, and the frequency characteristics were improved.

This embodiment, though being somewhat more complex than the foregoing first embodiment in the preparation process, is featured by better frequency characteristics.

In the present embodiment, the elastic member is of a cantilever type, but that of other types, for example a torsion bar type, can also be used.

[Embodiment 3]

Figure 12:
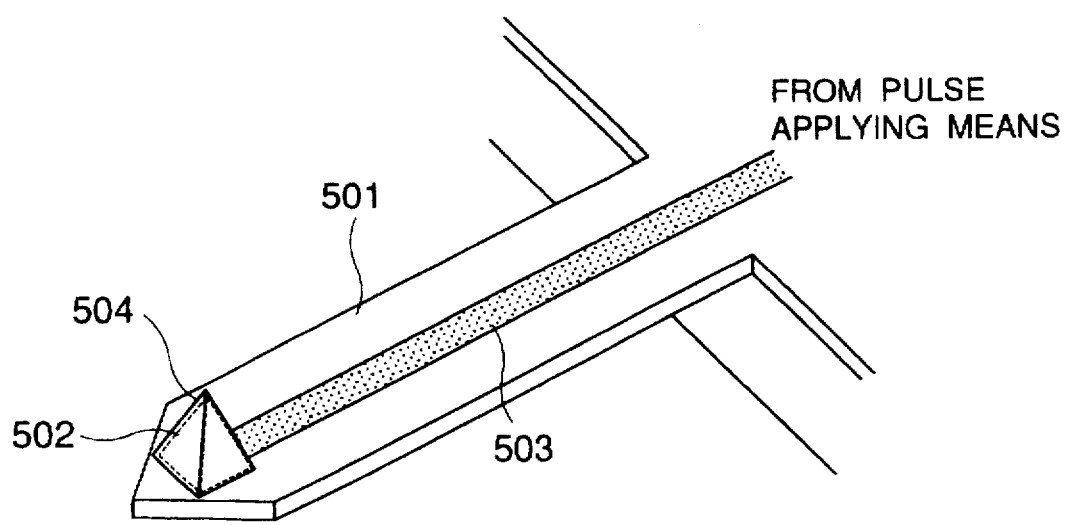
FIG. 12 is a view showing a probe constituting a third embodiment of the present invention.
Figure 13A:
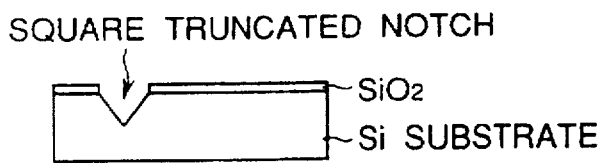
FIGS. 13(a) through 13(g) are views showing the preparation process of the probe shown in FIG. 12.
Figure 13F:
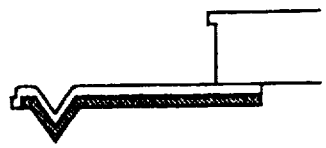
Figure 13B:
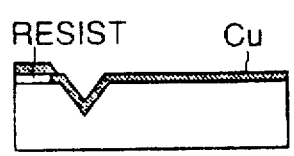
Figure 13G:
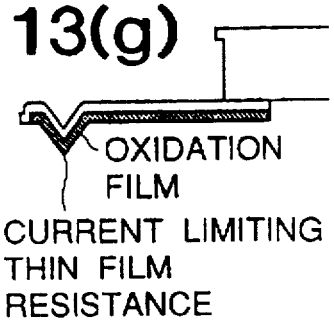
Figure 13C:
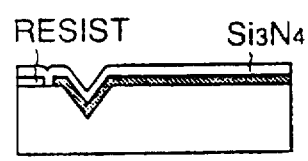
Figure 13D:
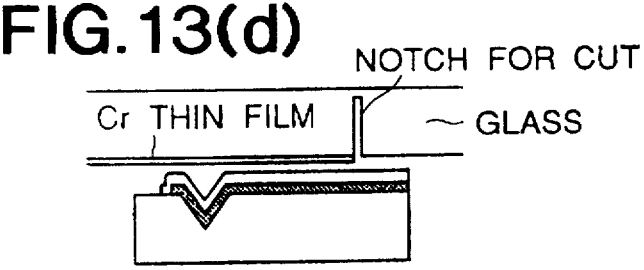
Figure 13E:
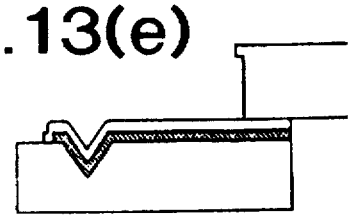

FIG. 12 shows another probe, constituting a third embodiment of the present invention, in which the current limiting resistance is integrally formed with the tip on a cantilever type elastic member.

Referring to FIG. 12, a tip 502 and a wiring 503 are formed on an elastic member 501 of cantilever type.

The surface of the tip 502 is covered by a current limiting thin-film resistor 504. A bending generated in the elastic cantilever 501 moves the tip 502 in the z-direction in FIG. 10.

As the current limiting thin-film resistor 504 is formed on the surface of the tip 502, the floating capacitance between the portion from the tip 502 to the current limiting thin-film resistor 504 and the recording medium (not shown) opposed to the tip 502 becomes almost zero, so that the equivalent circuit becomes similar to that shown in FIG. 5.

FIG. 13 shows the preparation process of the probe of this embodiment. On the surface of a Si substrate having a surface orientation <100>, a thermal oxide film ($SiO_2$) is formed with a thickness of 0.1 μm. Then, for forming the tip, the $SiO_2$ film is patterned into a rectangular mask, and anisotropic etching is conducted with KOH solution to form a groove of rectangular conical form ((a) in FIG. 13).

For forming the tip and the wiring on the cantilever, photoresist is patterned, and Cu is deposited by evaporation to form the tip and the wiring ((b) in FIG. 13). After the removal of the photoresist, a mask for forming the cantilever is patterned, and a $Si_3N_4$ film of a thickness of 1 μm is formed by low pressure CVD, thereby forming the cantilever form on the substrate ((c) in FIG. 13).

Then a groove for cutting is formed, and, after anodic bonding of a glass plate provided locally with a separating Cr film to the substrate ((d) in FIG. 13), the glass plate is cut ((e) in FIG. 13) and Si is etched off with KOH solution to form the cantilever ((f) in FIG. 13).

Finally heating to about 300° C. is conducted in water vapor atmosphere to form an oxide film on the surface of Cu, providing the current limiting thin-film resistor on the end of the tip ((g) in FIG. 13).

When the thus prepared probe was mounted on the recording/reproducing apparatus using the probe contact scanning method as shown in FIG. 4 (the current limiting resistance 1208 in FIG. 4 corresponding to the current limiting thin-film resistor (504 in FIG. 12) on the probe), and subjected to the application of a recording pulse voltage, the voltage VG applied to the recording medium was substantially equal, in height and wave form, to the applied recording pulse voltage VP as shown in FIG. 6, without reduction of the peak height or unsharpening of the wave form, and the frequency characteristics were improved.

This embodiment, being relatively simple in the preparation process as in the first embodiment, is featured by low cost and reduced tendency of bending formation in the elastic member. Also it provides the advantage of further improved frequency characteristics as in the second embodiment.

In the present embodiment, the elastic member is of a cantilever type, but that of other types, for example, a torsion bar type, can also be used.

[Embodiment 4]

Figure 14:
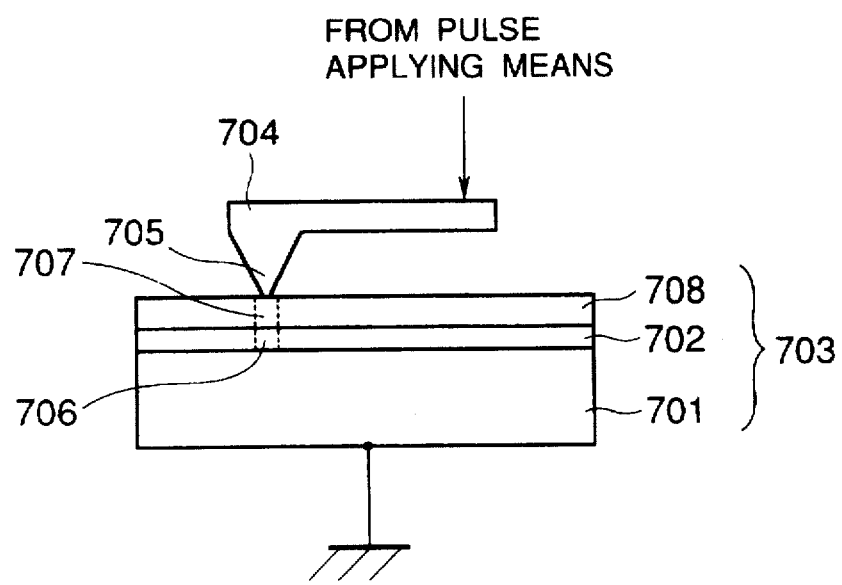
FIG. 14 is a view showing a recording medium constituting a fourth embodiment of the present invention.

FIG. 14 shows a recording medium, constituting a fourth embodiment of the present invention, in which a current limiting resistance is provided between a recording layer and a substrate.

Referring to FIG. 14, a recording medium 703 is composed of a conductive substrate 701, a current limiting thin-film resistor 702 formed thereon and a recording layer 708 formed thereon, and a probe 704 is so positioned as to be in contact with the recording layer 708.

As the current limiting thin-film resistor 702 is formed between the recording layer 708 and the substrate 701, the floating capacitance in a portion from the tip 705 to a portion 706 in the current limiting thin-film resistor 702 through a recording layer portion 707 opposed to the tip becomes almost zero, so that the equivalent circuit becomes similar to that shown in FIG. 7.

The recording medium of the present embodiment, bearing the current limiting thin-film resistor, is prepared in the following manner. Cleaved mica is used as the substrate, and is subjected to evaporation of Ag or Cu under heating to about 600° C. in vacuum. Thus Ag or Cu is epitaxially grown on the mica to provide a smooth surface of Ag or Cu, which is used as the conductive substrate. This substrate is heated to about 300° C. in water vapor atmosphere to form a surfacial oxide film, which is used as the current limiting thin-film resistor.

On this oxide film, there is formed a recording layer, composed for example of an LB film with electric memory property, an amorphous thin film or an oxidizable metal/semiconductor as explained in the foregoing.

The current limiting thin film resistor may also be formed, instead of the oxide film, of another high resistance material such as a $Si_3N_4$ film on an LB film of a high resistance having no electric memory property.

When thus prepared recording medium was mounted on the recording/reproducing apparatus of the probe contact scanning method as shown in FIG. 4 (the current limiting resistor 1208 being formed as a current limiting thin resistor film between the recording medium 1202 and the substrate 1201) and subjected to the application of a recording pulse voltage, the voltage VG applied to the recording medium was substantially equal, in height and wave form, to the applied recording pulse voltage VP as shown in FIG. 6, without reduction of the peak height or unsharpening of the wave form, and the frequency characteristics were improved.

In the configuration shown in FIG. 14, a similar effect can be obtained when the current limiting thin-film resistor is provided between the tip and the recording layer, namely on the surface of the recording layer. In such case, RG and RL are reversed in position in FIG. 7. Such recording medium can be obtained by forming a recording layer on a conductive substrate and then forming, on the recording layer, a thin film of a high resistance material as the current limiting thin-film resistor.

Also a similar effect can be obtained by forming the current-limiting thin-film resistor integrally with the recording layer.

Figure 15:
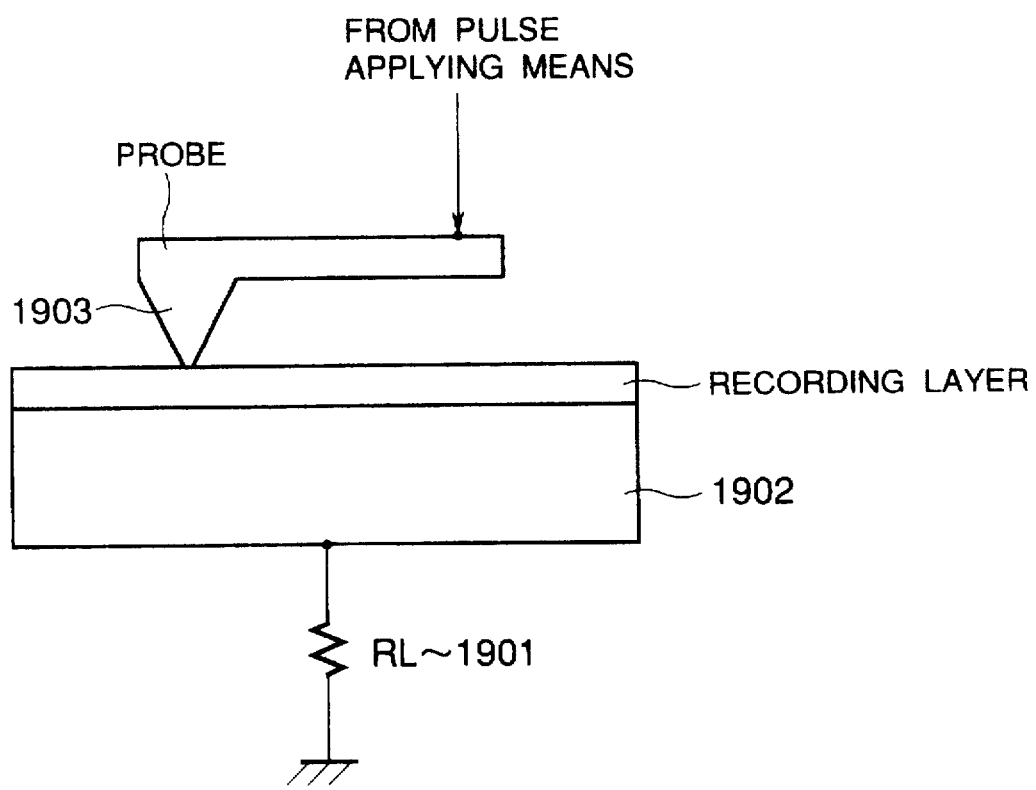
FIG. 15 is a view showing a configuration in which the current limiting resistance is provided opposite to the tip, with respect to the substrate.
Figure 16:
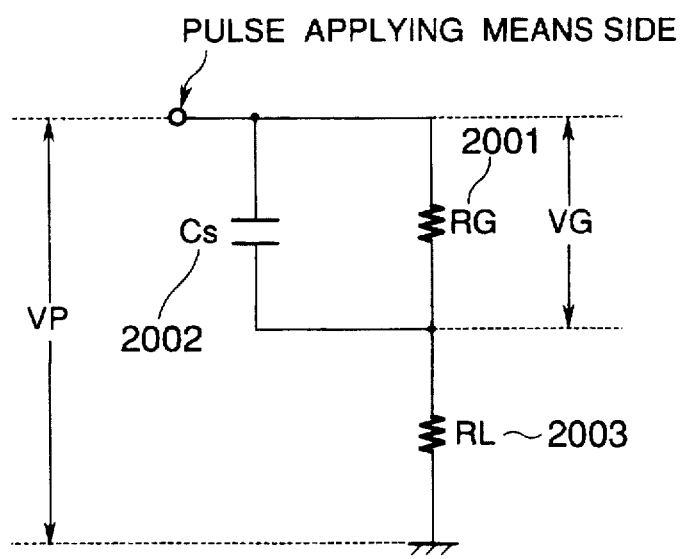
FIG. 16 is an equivalent circuit diagram in which the floating capacitance and the gap resistance are in a parallel relationship and the current limiting resistance is connected serially to these components.

Such recording medium can be obtained, for example in case of utilizing an LB film with electric memory property, by forming such LB film alternately with another LB film of high resistance without the electric memory property, without the oxide film formation on the substrate. This embodiment is featured by a considerably lower cost in comparison with other embodiments, since there is only required the addition of a step of forming the current limiting thin-film resistor, such as an oxide film, in the preparation process of the recording medium. There is also provided an advantage that the preparation process of the probe is not complicated, as the current limiting resistor is not provided in the probe. It is to be noted that the effect of the present embodiment cannot be obtained if the current limiting resistor 1901 is provided, as shown in FIG. 15, opposite to the probe 1903 across the substrate 1902. In such case the equivalent circuit becomes comparable to that shown in FIG. 16.

Figure 3:
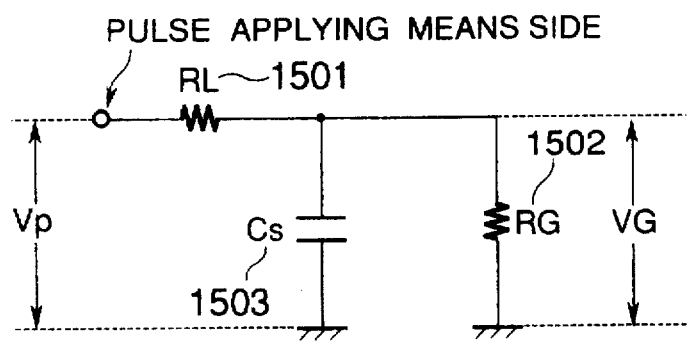
FIG. 3 is an equivalent circuit diagram for a coventional apparatus in which the floating capacitance and the gap resistance are in a parallel relationship and the current limiting resistance is serially connected to these components.

In such case, as shown in FIG. 3, the gap resistance RG2001 and the floating capacitance Cs become connected in parallel.

Figure 1:
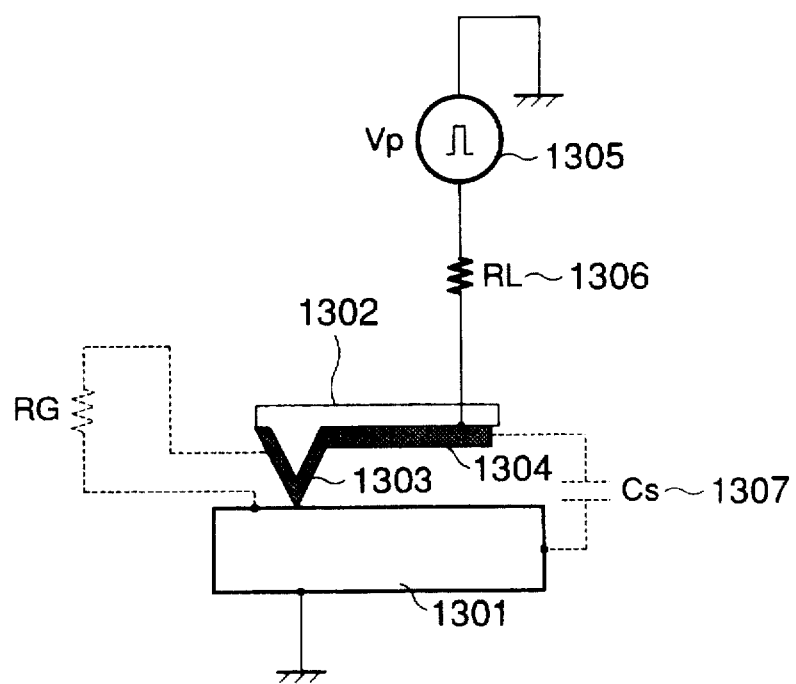
FIG. 1 is a conventional schematic view of a recording/reproducing apparatus of the contact scanning method.
Figure 2A:
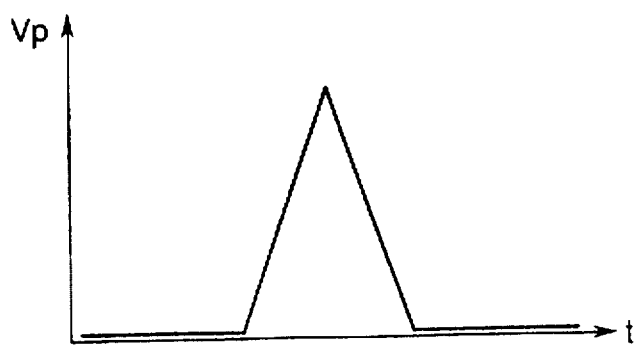
FIGS. 2 (a) and 2 (b) are charts showing comparison of the applied recording voltage and the voltage actually applied to the recording medium in a conventional apparatus.
Figure 2B:
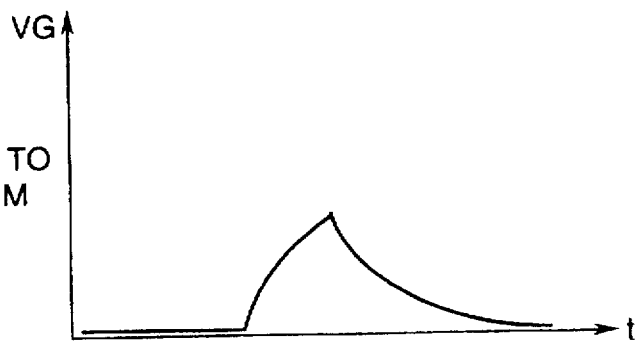

In case the impedance 1/ωCs caused by the floating capacitance Cs2002 is smaller than the gap resistance RG and the current limiting resistance RL, the voltage VG becomes smaller than VP, so that the voltage applied to the recording medium becomes smaller and unsharp, as shown in FIG. 2.

[Embodiment 5]

Figure 17:
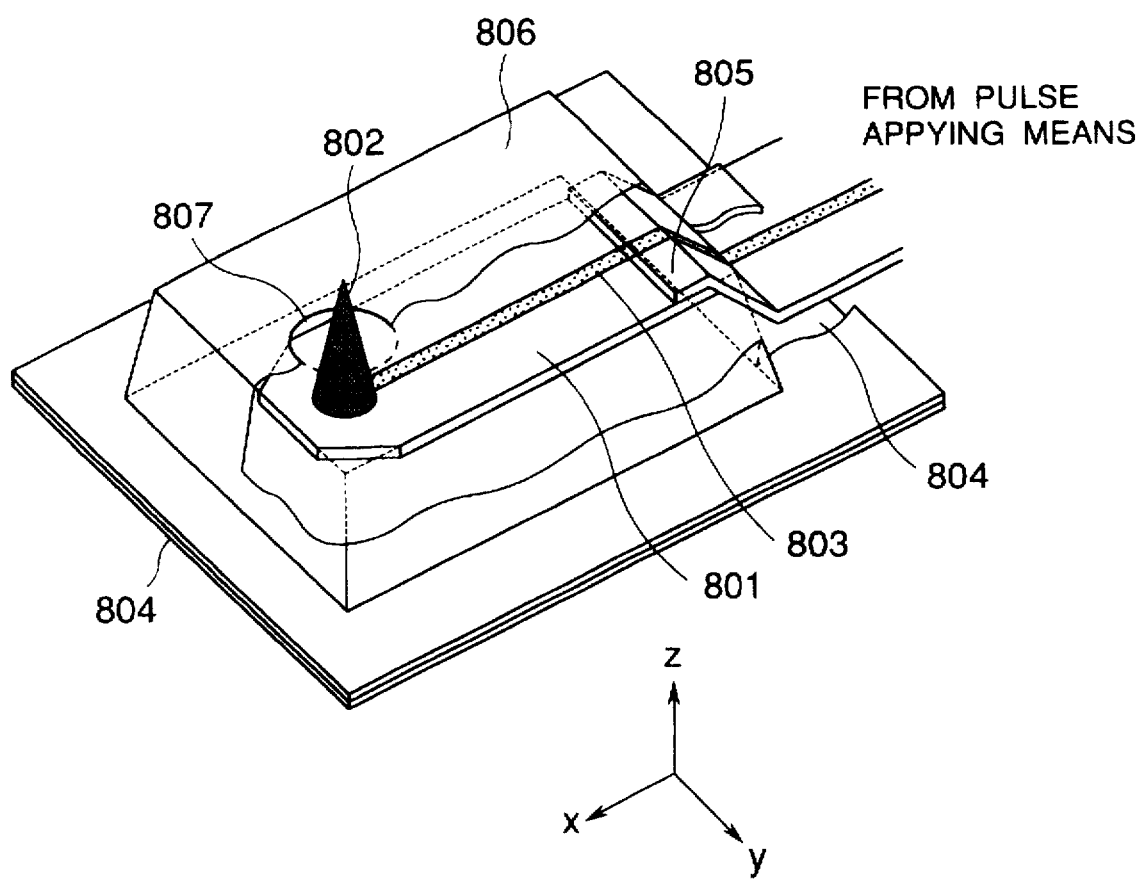
FIG. 17 is a view showing a probe constituting a fifth embodiment of the present invention.

FIG. 17 shows a probe constituting a fifth embodiment of the present invention, in which the floating capacitance of the pulse applying circuit is reduced.

Referring to FIG. 17, a tip 802 and wiring 803 are provided on an elastic cantilever 801.

A fixed end of the elastic cantilever 801 is fixed, by a cantilever support member 805, to a probe base plate 804. Bending generated in the elastic cantilever 801 causes the tip 802 to move in the z-direction in FIG. 17. The elastic cantilever 801 is entirely covered by an electromagnetic shield 806.

The electromagnetic shield 806 is electrically connected to the potential of the recording pulse signal from the pulse applying means.

Figure 18:
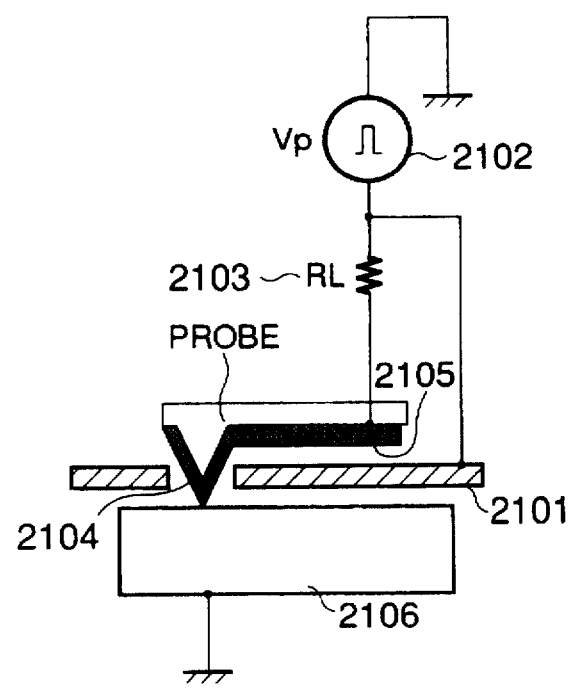
FIG. 18 is a view showing the connecting method for an electromagnetic shield.
Figure 19A:
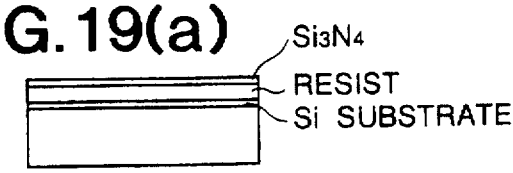
Figure 19B:
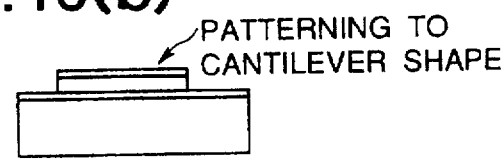
Figure 19C:
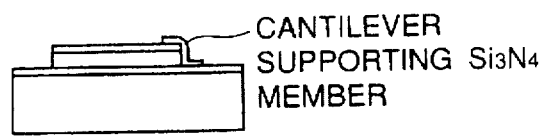
Figure 19D:
Figure 19E:
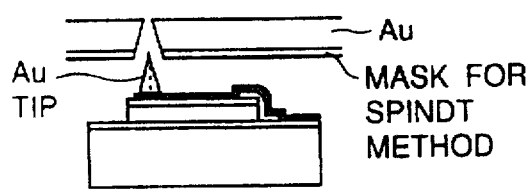
Figure 19F:
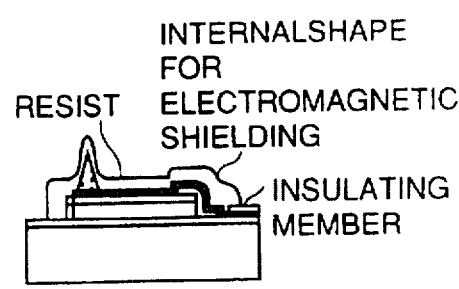
Figure 19G:
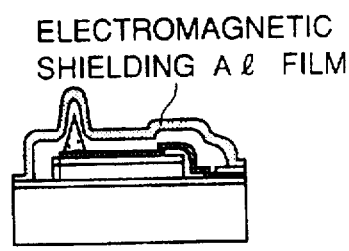
Figure 19H:
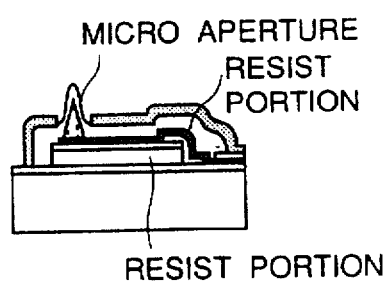
Figure 19I:

The state of the above-mentioned connection is shown in FIG. 18, in which it will be understood that the electromagnetic shield 2101 is connected between recording signal applying means 2102 and a current limiting resistance 2103. In this manner the floating capacitance between the tip 2104/wiring 2105 and the recording medium 2106 is reduced.

Again referring to FIG. 17, the electromagnetic shield 806 is provided, in a part thereof, with a small aperture 807 in the vicinity of the tip 802, so as to expose the end thereof to the exterior. In FIG. 17, a part of the electromagnetic shield is removed for the sake of ease understanding.

Since the wiring 803 and the base portion of the tip 802 are completely covered by the electromagnetic shield 806, except for the end of the tip 802, the floating capacitance between the tip/wiring and the recording medium (not shown) can be minimized.

Though the equivalent circuit is similar to that shown in FIG. 3, the floating capacitance Cs1503 can be made smaller, so that the impedance 1/ωCs resulting therefrom becomes sufficiently larger than the current limiting resistance RL.

FIG. 19 shows the preparation process of the probe of this embodiment. On a Si substrate surfacially bearing an oxide film (SiO₂), a photoresist film of a thickness of 3 μm is formed, and a Si₃N₄ film of a thickness of 1 μm is formed ((a) in FIG. 19). After this film is patterned into the shape of the cantilever ((b) in FIG. 19), a Si₃N₄ film of a thickness of 2 μm is formed and patterned to obtain a cantilever supporting Si₃N₄ member ((c) in FIG. 19).

Then, for forming the wiring on the cantilever, a photoresist film is again formed and patterned, and Al is deposited by evaporation to form an Al wiring ((d) in FIG. 19). Then, on the end portion of the cantilever, an Au tip of a height of 10 μm is formed by the Spindt method.

After the formation of an insulator for insulating the Al wiring from the electromagnetic shield, a photoresist film is again formed with a thickness of 5 μm and is patterned into the internal shape of the electromagnetic shield ((f) in FIG. 19).

Then an Al film is evaporated with a thickness of 1 μm for forming the electromagnetic shield ((g) in FIG. 19), and is so patterned to form a small aperture of a diameter of 3 μm in a position corresponding to the tip ((h) in FIG. 19). Finally the photoresist is removed by ozone plasma etching ((i) in FIG. 19).

When the thus prepared probe was mounted on the recording/reproducing apparatus using the probe contact scanning method as shown in FIG. 4 and subjected to the application of a recording pulse voltage, the voltage VG applied to the recording medium was substantially equal, in height and wave form, to the applied recording pulse voltage VP as shown in FIG. 6, without reduction of the peak height or unsharpening of the wave form, and the frequency characteristics were improved.

The present embodiment, though complex in the preparation process, can minimize the floating capacitance between the probe/wiring and the substrate, and is featured by a significant improvement in the frequency characteristics.

The present embodiment employs an elastic member of the cantilever type, but there may also be employed the elastic member of other types, such as of the torsion bar type.

[Embodiment 6]

Figure 20:
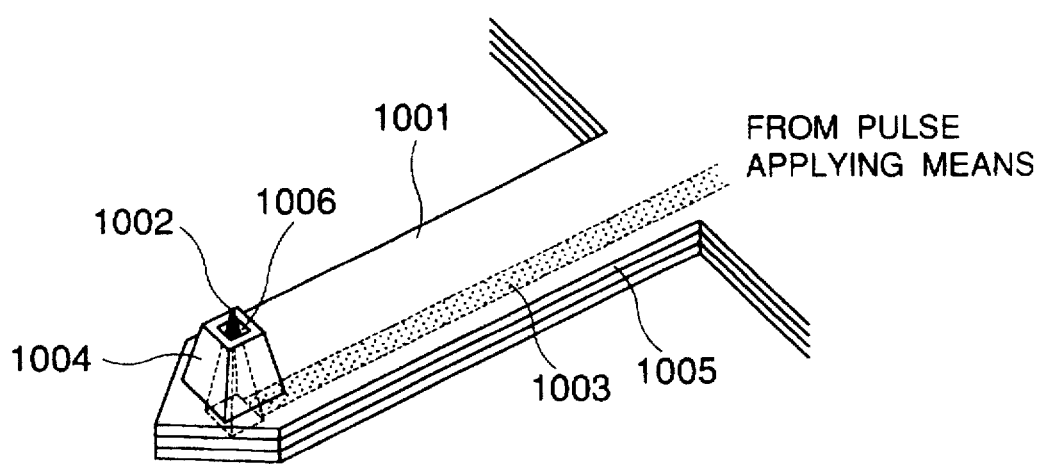
FIG. 20 is a view showing a probe constituting an sixth embodiment of the present invention.
Figure 20:
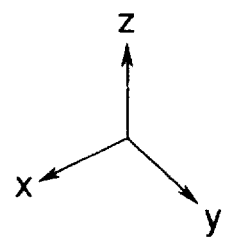
Figure 21A:
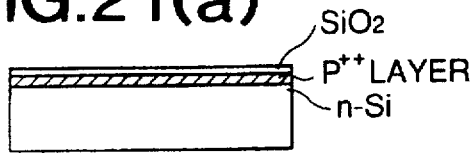
FIGS. 21(a) through 21(j) are views showing the preparation process of the probe shown in FIG. 20.
Figure 21B:
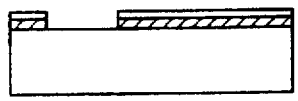
Figure 21C:
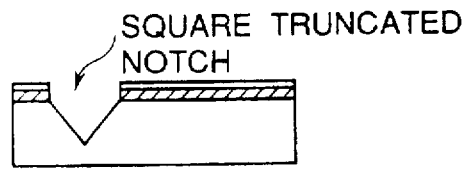
Figure 21D:
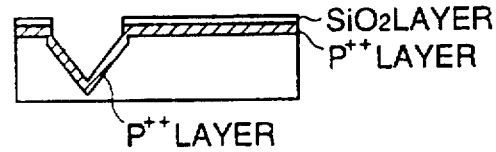
Figure 21E:
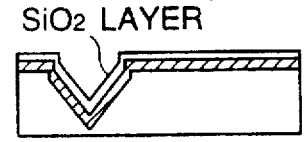
Figure 21F:
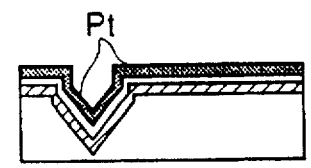
Figure 21G:
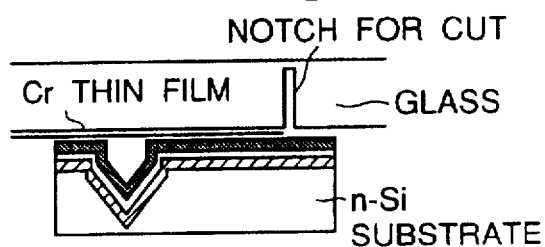
Figure 21H:
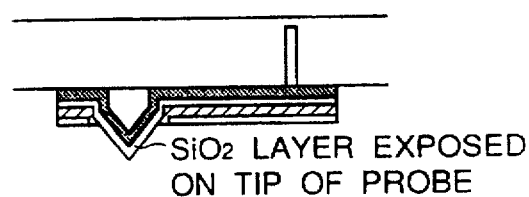
Figure 21I:
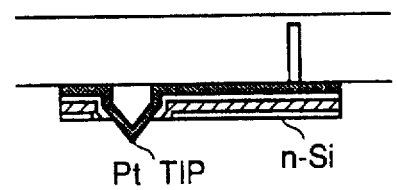
Figure 21J:
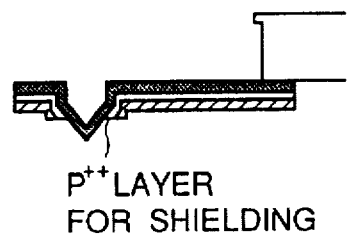

FIG. 20 shows another probe, constituting a sixth embodiment of the present invention, in which the floating capacitance of the pulse applying circuit is reduced.

Referring to FIG. 20, a tip 1002 and wiring 1003 are provided on an elastic cantilever 1001.

Bending generated in the elastic cantilever 1001 causes the tip 1002 to move in the z direction in FIG. 20. The top side of the elastic cantilever 1001, facing the recording medium, is covered with electromagnetic shields 1004, 1005, which are electrically connected to the potential of the recording pulse signal of the pulse applying means.

The state of this connection is similar to that shown in the foregoing fifth embodiment. The electromagnetic shield 1004 is provided, in a part thereof close to the tip 1002, with a small aperture 1006 so as to expose the end of the tip 1002.

As the wiring 1003 and the base portion of the tip 1002 are covered by the electromagnetic shields 1004, 1005 except for the end of the tip 1002, the floating capacitance between the tip/wiring and the recording medium/substrate can be made small.

Though the equivalent circuit is similar to that shown in FIG. 3, the floating capacitance Cs1503 can be made small. Consequently the impedance 1/ωCs, resulting therefrom, becomes larger than the current limiting resistance RL.

FIG. 21 shows the preparation process of the probe of the present embodiment. On an n-Si substrate, having a surfacial orientation <100>and so doped with B as to form a p⁺⁺ layer of a depth of 1 μm, an oxide film (SiO₂) is formed ((a) in FIG. 21). After the SiO₂ film and the p⁺⁺ layer are etched off in the form of a mask for tip formation ((b) in FIG. 21), anisotropic etching is conducted with KOH solution to form a groove in a rectangular conical form ((c) in FIG. 21).

Then B is doped by ion implantation to form a p⁺⁺ layer in the rectangular conical groove ((d) in FIG. 21), and the substrate is treated in water vapor of 300° C. to form an oxide film (SiO₂) in the p⁺⁺ layer ((e) in FIG. 21). Then Pt is deposited by evaporation, for forming the tip and the wiring ((f) in FIG. 21).

Then a cutting groove is formed, and, after anodic bonding of a glass plate partially provided with a separating Cr film ((g) in FIG. 21), the n-Si substrate is etched with KOH solution until the SiO₂ layer corresponding to the end portion of the tip is exposed ((h) in FIG. 21). Subsequently the SiO₂ layer, exposed at the end of the tip, is removed with HF solution, to expose the Pt tip ((i) in FIG. 21). Finally the glass plate is cut, and the remaining n-Si is etched off with KOH solution to complete the cantilever (FIG. 21(j)).

When thus prepared probe was mounted on the recording/reproducing apparatus of the probe contact scanning method as shown in FIG. 4 and subjected to the application of a recording pulse voltage, the voltage VG applied to the recording medium was substantially equal, in height and wave form, to the applied recording pulse voltage VP as shown in FIG. 6, without reduction of the peak height or unsharpening of the wave form, and the frequency characteristics were improved.

This embodiment, though being somewhat inferior in the improvement of the frequency characteristics to the foregoing fifth embodiment, is featured by a low cost because of the relatively simple preparation process.

The present embodiment employs an elastic member of the cantilever type, but there may also be employed an elastic member of other types, such as of a torsion bar type.

What is claimed is:

1. A probe for use in an information recording apparatus for recording information on a recording medium by applying a voltage between the recording medium and a tip of said probe, said probe comprising:

a conductive tip;

a wiring provided on said probe for applying a voltage to said tip; and an electrical resistance provided in said tip or in the wiring on said probe.

2. A probe according to claim 1, wherein said resistance is provided in a member constituting said tip.

3. A probe according to claim 2, wherein said resistance is composed of an oxide film on the surface of said tip.

4. A probe for use in an information recording apparatus for recording information on a recording medium by applying a voltage between said recording medium and a tip of said probe, the probe comprising:

a conductive tip;

a wiring provided on said probe for applying a voltage to said tip; and an electromagnetic shield covering said tip or the wiring on said probe.

5. A recording medium for use in an information recording apparatus for recording information on a recording medium by applying a voltage between said recording medium and a tip of a probe, the recording medium being composed of a conductive substrate and a recording layer formed on said substrate and comprising:

an electrical resistance layer provided between said substrate and said tip.

6. A recording medium according to claim 5, wherein said resistance layer is provided between said recording layer and said substrate.

7. A recording medium according to claim 5, wherein said resistance layer is provided in said recording layer.

8. A recording medium according to claim 5, wherein said resistance layer is provided on said recording layer.

9. An information recording apparatus for recording information on a recording medium by applying a voltage between said recording medium and a tip of a probe, comprising:

a probe having a conductive tip;

a voltage applying circuit for applying a voltage to said tip;

a wiring provided on said probe, for connecting said voltage applying circuit with said tip; and an electrical resistance provided in said tip or in the wiring on said probe.

10. An information recording apparatus for recording information on a recording medium by applying a voltage between said recording medium and a tip of a probe, comprising:

a voltage applying circuit for applying a voltage between said tip and said recording medium;

a conductive substrate provided in said recording medium;

a recording layer provided in said recording medium and supported by said substrate; and an electrical resistance layer provided between said substrate and said tip.

11. An information recording apparatus for recording information on a recording medium by applying a voltage between said recording medium and a tip of a probe, comprising:

a probe having a conductive tip;

a voltage applying circuit for applying a voltage to said tip;

a wiring provided on said probe, for connecting said voltage applying circuit with said tip; and an electromagnetic shield covering said tip or the wiring on said probe.

* * * * *

UNITED STATES PATENT AND TRADEMARK OFFICE
CERTIFICATE OF CORRECTION

Page 1 of 3

PATENT NO. : 5,751,686
DATED : May 12, 1998
INVENTOR(S) : Kuroda et al.

It is certified that error appears in the above-indentified patent and that said Letters Patent is hereby corrected as shown below: On the title page,

[57] Abstract:

Line 10, "alteractive" should read --alternative--.

COLUMN 1:

Line 49, "thickness in" should read --thickness exists in--.

COLUMN 3:

Line 18, "between" should read --between the--; and
    Line 56, "conventional" should be deleted, and "of a" should read --of a conventional--.

COLUMN 4:

Line 42, "9(i)" should read --19(i)--.

COLUMN 6:

Line 37, "medium," should read --medium--.

COLUMN 7:

Line 1, "$\omega$being" should read --$\omega$ being--;
    Line 38, "Al" should read --A$\ell$--; and
    Line 48, "When" should read --When the--.

UNITED STATES PATENT AND TRADEMARK OFFICE
CERTIFICATE OF CORRECTION

PATENT NO. : 5,751,686
DATED : May 12, 1998
INVENTOR(S) : Kuroda et al.

It is certified that error appears in the above-identified patent and that said Letters Patent is hereby corrected as shown below:

<u>COLUMN 8</u>:

Line 6, "a wiring 303" should read --wiring 303--; and
    Line 40, "When" should read --When the--.

<u>COLUMN 10</u>:

Line 17, "When" should read --When the--.

UNITED STATES PATENT AND TRADEMARK OFFICE
CERTIFICATE OF CORRECTION

PATENT NO. : 5,751,685
DATED : May 12, 1998
INVENTOR(S) : Kuroda et al.

It is certified that error appears in the above-identified patent and that said Letters Patent is hereby corrected as shown below:

COLUMN 11:

Line 27, "ease" should read --ease of--;
　　　Line 47, "Al" should read --A$\ell$--;
　　　Line 48, "Al" should read --A$\ell$--;
　　　Line 51, "Al" should read --A$\ell$--; and
　　　Line 56, "Al" should read --A$\ell$--.

COLUMN 12:

Line 35, "Cs1503" should read --Cs1503--; and
　　　Line 61, "When" should read --When the--.

Signed and Sealed this

Thirteenth Day of July, 1999

Q. TODD DICKINSON

Attest:

Attesting Officer

Acting Commissioner of Patents and Trademarks